United States Patent [19]

Domer et al.

[11] Patent Number: 4,771,990
[45] Date of Patent: Sep. 20, 1988

[54] HYDRAULIC ANTIVIBRATION SUPPORT SLEEVES

[75] Inventors: Michel Domer, Val-Dampierre; Daniel Dubos, Asnieres, both of France

[73] Assignee: Hutchinson, France

[21] Appl. No.: 22,648

[22] Filed: Mar. 6, 1987

[30] Foreign Application Priority Data

Mar. 19, 1986 [FR] France .................................. 8603915

[51] Int. Cl.$^4$ ................................................ F16F 5/00
[52] U.S. Cl. .................................. 267/140.1; 267/219
[58] Field of Search ................ 248/562; 267/35, 121, 267/140.1, 141, 141.1, 219

[56] References Cited

U.S. PATENT DOCUMENTS

| | | | |
|---|---|---|---|
| 3,698,703 | 10/1972 | Hipsher | 267/140.1 X |
| 4,458,888 | 7/1984 | Wolf et al. | 267/140.1 |
| 4,593,891 | 6/1986 | Okamoto et al. | 267/140.1 |
| 4,630,806 | 12/1986 | Dan et al. | 267/140.1 |

FOREIGN PATENT DOCUMENTS 0172743  9/1985  Japan .............................. 268/140.1

Primary Examiner—Duane A. Reger
Attorney, Agent, or Firm—Larson and Taylor

[57] ABSTRACT

The support sleeve comprises two rigid coaxial and concentric armatures of revolution joined to one another by a body of elastomer adhered to the latter and shaped so as to form at least two fluid-tight pockets. These pockets communicate with one another through a throttled passage and are filled with liquid as well as said passage. Bearing surfaces adapted to come into radial abutment against one another in the direction of hydraulic working of the sleeve during the exertion of strong radial forces between the two armatures in this direction, are provided respectively on these two armatures and are positioned axially outside the pockets.

10 Claims, 2 Drawing Sheets

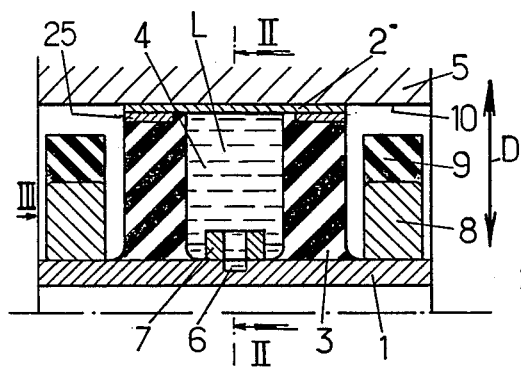
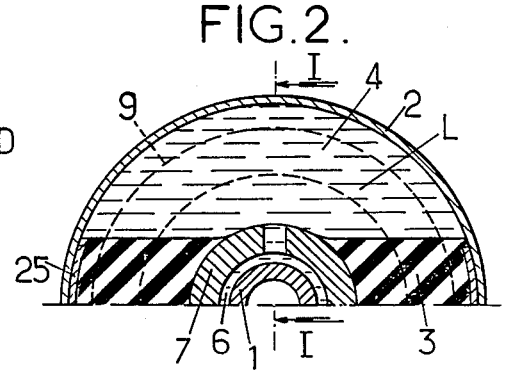
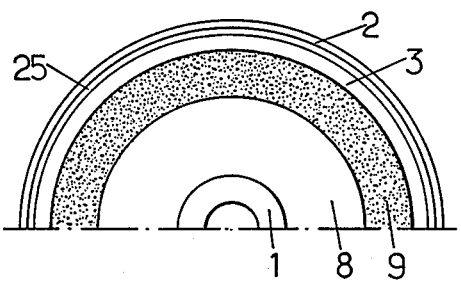
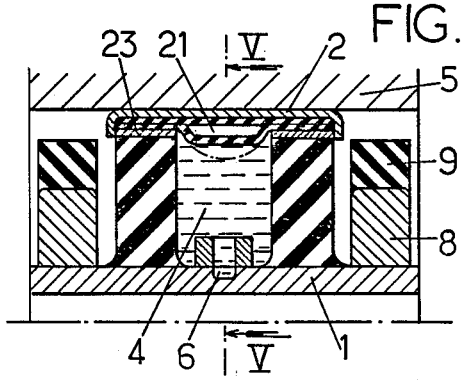
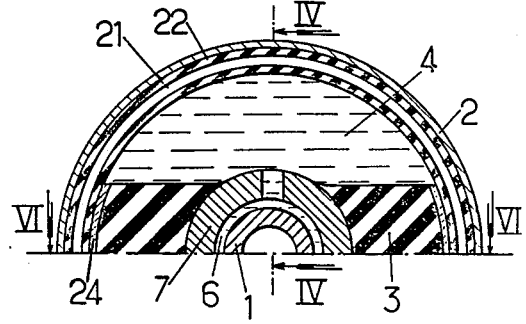
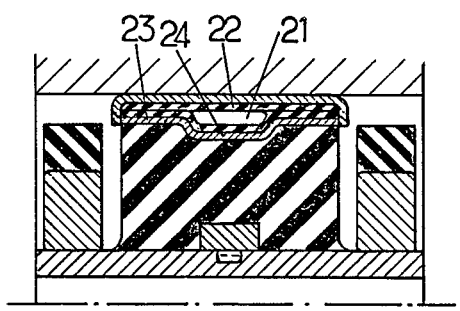

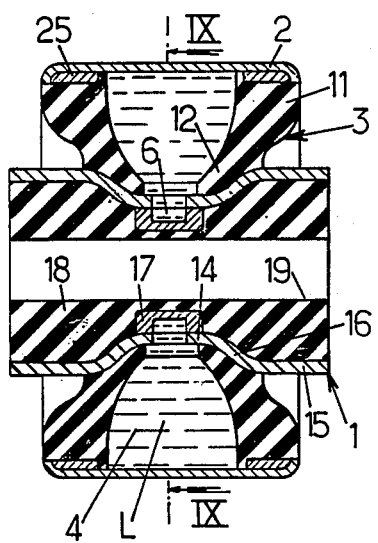
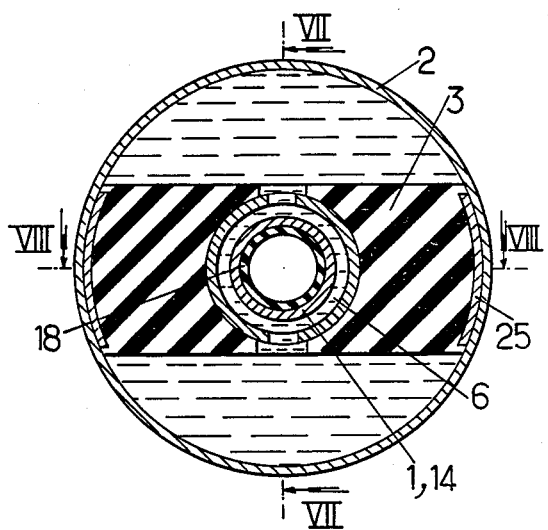
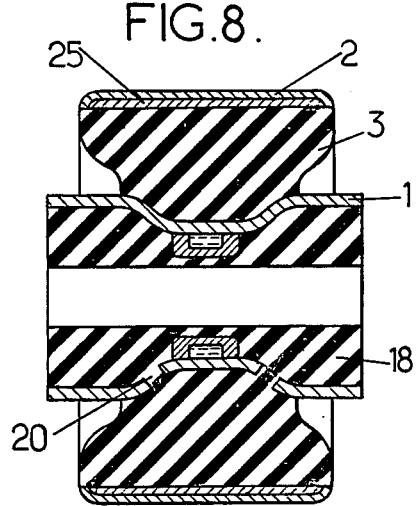

HYDRAULIC ANTIVIBRATION SUPPORT SLEEVES

The invention relates to hydraulic antivibration support sleeves comprising two tubular rigid armatures surrounding one another and preferably of revolution, coaxial and concentric at least under load, said armatures being joined together by a body of elastomer adhered to the latter and shaped so as to form at least two fluid-tight pockets between the two armatures, these pockets communicating with one another through a throttled passage and being filled with liquid as well as said passage.

Such sleeves are intended to be mounted between two rigid parts which can be made fast respectively with the two armatures and capable of undergoing with respect to one another oscillations oriented in a diametrical direction D with respect to the common axis of the two armatures, the whole being arranged so that, for certain at least of these oscillations, the liquid is driven back alternately from one of the pockets to the other and conversely through the throttled passage, which creates in this liquid a resonance phenomenon suitable for damping the transmission of oscillations from one of the armatures to the other.

Sleeves of the type concerned are for example intended to be inserted between, on the one hand, a vehicle chassis and, on the other hand, the internal combustion engine or the front or rear train of this vehicle.

To limit the amplitude of the deformations of the elastic body joining the two armatures of such a sleeve, during the exertion of strong forces in the direction D on one of these armatures with respect to the other, it has already been proposed to cause these two armatures to comprise respectively two bearing surfaces adapted to be applied or to abut against one another in said direction D.

In known constructions of sleeves so defined, the bearing surfaces concerned respectively bound two distinct portions of a same pocket.

These types of construction present the following drawback: during the strong forces mentioned above, by reason of the presence of the stop surfaces inside the hydraulic pockets, the throttled passage risks being closed by these stop surfaces themselves and there is a risk of other throttled passages being formed unintentionally in the same pockets by said bearing or stop surfaces.

It is a particular object of the invention to overcome this drawback and, in preferred embodiments, to render the sleeves concerned such that they ensure the filtering of vibrations of relatively low amplitude, namely less than 0.5 mm, and of relatively high frequency, namely higher than 20 Hz.

For this purpose, sleeves of the type concerned are essentially characterized according to the invention in that the bearing surfaces designed to come into a radial abutment against one another during the strong forces exerted radially between the two armatures are positioned axially outside the pockets.

In the preferred embodiments, recourse is had in addition to one and/or other of the following arrangements:

one of the two outer bearing surfaces is formed by a continuous elastic ring fitted onto one of the two armatures, the continuous elastic ring is mounted inside the outer armature and constitutes a beading projecting axially comprised by the body of elastomer which connects the two armatures to one another, the second outer bearing surface with which the ring coacts for the purposes of a radial stop is a cylindrical portion of enlarged diameter of the inner armature axially prolonging a narrowed neck of the latter, the inner armature is a rigid tube and the throttled passage comprises an annular section bounded externally by a portion of this tube and for the rest by a ring of revolution lodged adjacently in this portion and having in axial half-section the shape of a U open radially outwardly, the fluid-tightness between the ring and the tube being ensured by a bushing of elastomer which lines the inside of the tube and in which the ring is buried, said annular section of the throttled passage communicating with the pockets through ports perforated in the tube, the tube according to the preceding paragraph is perforated by other ports enabling the bushing of elastomer and the body of elastomer which connects the two armatures to one another to be obtained by molding in a single block, an air chamber bounded by a fluid-tight and flexible wall or a similar deformable body is provided in one at least of the pockets, each deformable body extends along the inner surface of the outer armature, in a sleeve comprising several pockets each lined with an air chamber, a permanent communication is established between the various air chambers, the above deformable body is constituted by a cushion of closed cell alveolar material.

The invention comprises, apart from these main features, certain other features which are preferably used at the same time and which will be more explicitly considered below.

In the following, there will be described several preferred embodiments of the invention with reference to the accompanying drawings given of course as nonlimiting.

FIGS. 1 to 3, of these drawings, show a hydraulic antivibration sleeve constructed according to the invention, respectively in axial half-section along the line I—I, FIG. 2, in transverse half-section along the line II—II, FIG. 1 and in half end view along the arrow III, FIG. 1.

FIGS. 4 to 6 show a modification of such a sleeve also according to the invention respectively in axial half-section along the line IV—IV, FIG. 5, in transverse half-section along the line V—V in FIG. 4 and in axial half-section along the line VI—VI, FIG. 5.

FIGS. 7 to 9 show another modification again according to the invention, respectively in axial sections along the lines VII—VII and VIII—VIII, FIG. 9 and in transverse section along IX—IX, FIG. 7.

In each case, the sleeve comprises:
an inner metal armature of revolution 1,
an outer metal armature of revolution 2 coaxial with the armature 1 and surrounding the latter,
and an elastomeric body 3 joining one to the other of the two armatures 1 and 2 by forming between the latter two fluid-tight pockets 4.

The inner armature 1 is intended to be made fast with a spindle (not shown) which passes through it contiguously while the outer armature 2 is designed to be made fast with a bearing 5, this spindle and this bearing being made fast respectively to two elements between which it is desired to mount an antivibration support, elements such as a vehicle engine and the chassis of this vehicle.

The two pockets 4 communicate with one another through a throttled passage 6.

These two pockets and the throttled passage are filled with a liquid L.

In the embodiments of FIGS. 1 to 6, the two armatures 1 and 2 are cylindrical tubes and the throttled passage 6 comprises, on the one hand an annular section bounded internally by an annular groove hollowed in the outer surface of the inner tube 1 and externally by a ring 7 in adjacent engirdling relationship with this tube 2 and, on the other hand, two radial holes formed in said ring 7 and causing the annular section to communicate with the two pockets 4.

The body 3 is composed of two identical and parallel thick washers joined axially with one another by two thick arms which divide the space comprised between these two washers into the two pockets 4.

To limit the amplitude of the radial deformations of the body 3, there are attached to the two axial ends of the inner tube 1, said ends projecting outside said body 3, two thick rigid discs 8 themselves engirdled by rims 9 of elastomer whose outer diameter is slightly less than the inner diameter of the external armature 2.

Although this external armature 2 may overlap axially beyond the body 3 and thus present ends positioned radially facing the rims 9, this is not the case in the embodiments illustrated in FIGS. 1 to 6.

In this case, after forced mounting of the armature 2 in the bearing 5, the two rims 9 are to be found radially facing the cylindrical areas 10 of this bearing surface.

On severe deformations of the sleeve, due to the application of strong forces to one of the two armatures 1 and 2 with respect to the other in the diametrical direction D, which is vertical in the drawings, one at least of the rims 9 comes into abutment in this direction D against the facing area 10.

This abutment is effected gradually due to the elasticity of the constituent material of the rims.

Thus a flexible and efficient limitation of the deformations of the sleeve is obtained.

In addition, in view of the location of the rims 9 outside the pockets 4, the abutment of these rims against the facing areas is not accompanied by any obstruction of the throttled passage 6, nor of any creation of an additional throttled passage, which enables the sleeve to play under all circomstances the exact role of shock absorber for which it has been designed.

It is recalled that, in manner known in itself, this shock-absorbing role is fulfilled by alternate driving back of the liquid L from one pocket 4 into the other through the throttled passage 9 in rhythm with the oscillations to be damped, which are supplied to the support in the direction D, which is the direction of the axis common to the two ports terminating the throttled passage 6.

The dimensions of said passage 6, and in particular the ratio between its length and its section, are determined in advance so that the alternate driving back mentioned generates in the liquid L a resonance phenomenon which can efficiently oppose the transmission, from one armature to the next, of oscillations of well-determined amplitude and frequency.

In the modification illustrated in FIGS. 7 to 9, the elastic rims which play the role of radial stops are beadings 11 constituting the outer peripheral portions of the annular walls comprised by the body 3, said beadings being adhered against the inner surface of the outer armature 2.

In this case, the zones 12 of small diameter of said walls are thinned and brought axially closer to one another so as to free an annular space just within each beading 11.

The inner armature 1 is constituted on its side by a tube in the form of a diabolo having a narrowed central neck 14 and cylindrical axial ends 15 of greater diameter arranged radially facing the beadings 11.

The zones 12 which are thinned and brought together are adhered to the outer surface of the flared annular zone 16, of the tube 1, which joins the neck 14 to the spread-out ends 15.

This conformation is advantageous in that it permits the elastic zones 12 to work in flexion, and not only in compression during their deformation.

In this case, the throttled passage comprises also an annular section joined to two radial ports.

However here the two radial ports are formed in the neck 14 of the tube 1 and the annular section is bounded externally by the inner surface of this neck and for the rest by an annular ring 17 housed adjacently in said neck and having an axial half section shaped as a U open radially outwards.

The fluid-tightness between the ring 17 and the neck 14 is ensured by a bushing 18 of elastomer lining the tube 1 internally.

This bushing is formed axially by a cylindrical channel 19 serving as a housing for the mounting spindle mentioned above.

To ensure good adherence to the tube 1 of all of the elastomeric parts 11, 12 and 18, they are produced from molding in a single part and there is provided, hollowed in the spread-out zone 16 of the tube 1, communication ports 20 which are themselves filled with elastomer during said molding.

With this construction of FIGS. 7 to 9, it is easily possible to give the overall axial dimension of the peripheral zone of the sleeve, including here its outer stops, a relatively small value, which constitutes an important advantage of said construction.

It is in fact to the inner tube 1 that the greatest axial length must be given, in view of the placing in position of the sleeve between the elements to be joined by the latter involving generally a mounting of this inner tube between the two arms of a fork.

It may be noted on this subject that the increased diameter of the ends 15 of the tube enables a relatively large support surface to be offered for the sleeve thus gripped in the fork.

In the latter embodiment, as in the preceding ones, the radial deformations of great amplitude of the sleeve in the direction D involve a gradual application of the beadings 11 against the facing terminal sections 15 of the tube 1.

These deformations are thus limited with flexibility and effectiveness.

In improved embodiments, sleeves of the type described above are rendered capable not only of damping oscillations of relatively large amplitude and relatively low frequency by the creation of a resonance phenomenon in the liquid which flows in the throttled passage, but also of filtering certain vibrations of smaller amplitude, namely less than 0.5 mm and of higher frequency, namely higher than 20 Hz, by avoiding the placing in resonance of the liquid in the throttled passage.

For this purpose, there is placed in one at least of the pockets 4 an air chamber or the like 21 (see FIGS. 4 to 6) bounded by a fluid-tight and flexible thin wall 22.

Introduction of such a chamber 21 into the pockets 4 above is rendered possible by the fact that the limit stops of the radial deformations are no longer contained inside these pockets but are here disposed outside said pockets.

The chamber 21 is, for example, constituted by a tubular bladder or chamber of rubber containing air or another gas preferably slightly compressed, decomposed transversely into a freely deformable central portion and into two lateral portions gripped respectively between, on the one hand, the outer armature 2 and, on the other hand, two metalferrules 23 surrounding the two constituent annular walls of the body 3.

The chamber 21 may be provided in one alone of the pockets 4.

In the embodiment illustrated by way of example in FIGS. 4 to 6, two chambers 21 are provided in respectively the two pockets 4, these two chambers being constituted by two sections of a same continuous annular bladder communicating between them permanently, for which a passage is reserved for the central transverse portion of the bladder between the constituent radial arms of the body 3 and the outer armature 2, as is seen in FIG. 6: to this end the two ferrules 23 may be joined axially to one another by two offset bridge portions 24.

The latter formula has the advantage that any swelling of one of the two chambers 21 is automatically translated by a shrinkage of the other chamber and conversely.

It is easily understood that deformations of relatively low amplitude and of relatively high frequency applied in the direction D to one of the two armatures 1 and 2 is not translated by a driving back of liquid into the throttled passage 6 but by a deformation of each chamber 21, which permits the transmisson of these vibrations to the other armature to be avoided.

The air or gas chamber 21 described above may be replaced by any similar deformable body such as a cushion of alveolar material with closed cells.

In FIGS. 1 to 3 and 7 to 9, there is seen at 25 a section of rigid tube encaging the body of elastomer 3 and hollowed radially facing the pockets 4 to permit the radial unmolding of cores designed to form these pockets in said body. It is on this tube 25 that the outer armature 2 is force-fitted while the whole is, for example, immersed in a bath of liquid L, which ensures the filling of the sleeve with this liquid.

Fluid-tightness between this tube 25 and the armature 2 is ensured by ribs or edges of elastomer formed in the body 3: to this end there is exerted a radial restraint on the constituent rigid elements of the tube 25, said elements being made narrower than the areas of said body 3 which encage them, which causes said ribs to appear by radial overlapping along these elements.

As a result of which, and whatever the embodiment adopted, there are finally provided hydraulic antivibration sleeves whose constitution, operation and advantages emerge sufficiently from the foregoing.

As is self-evident, and as results beside already from the foregoing, the invention is in no way limited to those of its types of application and embodiments which have been more especially envisaged; it encompasses thereof, on the contrary, all modifications.

We claim:

1. Support sleeve comprising two mutually surrounding tubular rigid armatures, joined to one another by an elastomeric body adhered to them and shaped so as to form at least two fluid-tight pockets, said pockets communicating with one another through a throttled passage and spaced being filled with liquid (L) as well as said passage, and bearing surfaces being provided respectively on the two armatures to come into radial abutment against one another in the direction (D) of hydraulic working of the support during the exertion of strong radial forces between these two armatures in this direction, characterized in that these bearing surfaces are positioned axially outside the pockets.

2. Support sleeve according to claim 1, characterized in that one of the two outer bearing surfaces is formed by a continuous elastic ring attached to one of the two armatures.

3. Support sleeve according to claim 2, characterized in that the continuous elastic ring is mounted inside the outer armature and constitutes an axially projecting beading comprised by the body of elastomer which joins the two armatures to one another.

4. Support armature according to claim 3, characterized in that the second outer bearing surface with which the continuous ring coacts for the purposes of a radial stop is a cylindrical portion of enlarged diameter of the inner armature axially extending a narrowed neck of the latter.

5. Support sleeve according to claim 1, characterized in that the inner armature is a rigid tube and in that the throttled passage comprises an annular section bounded externally by a portion of this tube and for the rest by a ring of revolution housed adjacently in this portion and having in axial half-section the shape of a U open radially outwards, the fluid-tightness between the ring and the tube being ensured by a bushing of elastomer which lines the inside of the tube and in which the ring is buried, said annular section of the throttled passage communicating with the pockets through ports perforated in the tube.

6. Support sleeve according to claim 5, characterized in that the rigid tube is perforated by other ports enabling the molding in a single block of the bushing of elastomer and the body of elastomer which joins the two armatures to one another.

7. Support sleeve according to claim 1, characterized in that an air chamber bounded by a flexible and fluid-tight wall or a similar deformable body is provided in one at least of the pockets.

8. Support sleeve comprising two mutually surrounding tubular rigid armatures, joined to one another by an elastomeric body adhered to them and shaped so as to form at least two fluid-tight pockets, said pockets communicating with one another through a throttled passage and being filled with liquid (L) as well as said passage, and bearing surfaces being provided respectively on the two armatures to come into radial abutment against one another in the direction (D) of hydraulic working of the support during the exertion of strong radial forces between these two armatures in this direction, these bearing surfaces being positioned axially outside the pockets, an air chamber bounded by a flexible and fluid-tight wall or a similar deformable body being provided in one at least of the pockets, each deformable body extending along the inner surface of the outer armature.

9. Support sleeve comprising two mutually surrounding tubular rigid armatures, joined to one another by an elastomeric body adhered to them and shaped so as to form at least two fluid-tight pockets, said pockets communicating with one another through a throttled passage and being filled with liquid (L) as well as said passage, and bearing surfaces being provided respectively on the two armatures to come into radial abutment against one another in the direction (D) of hydraulic working of the support during the exertion of strong radial forces between these two armatures in this direction, these bearing surfaces being positioned axially outside the pockets, an air chamber bounded by a flexible and fluid-tight wall or a similar deformable body being provided in one at least of the pockets, and including several pockets, each lined with an air chamber, a permanent communication being established between the different air chambers.

10. Support sleeve comprising two mutually surrounding tubular rigid armatures, joined to one another by an elastomeric body adhered to them and shaped so as to form at least two fluid-tight pockets, said pockets communicating with one another through a throttled passage and being filled with liquid (L) as well as said passage, and bearing surfaces being provided respectively on the two armatures to come into radial abutment against one another in the direction (D) of hydraulic working of the support during the exertion of strong radial forces between these two armatures in this direction, these bearing surfaces being positioned axially outside the pockets, an air chamber bounded by a flexible and fluid-tight wall or a similar deformable body being provided in one at least of the pockets, the deformable body being constituted by a cushion of alveolar material with closed cells.

* * * * *